(No Model.)

V. W. MASON.
Reversing Mechanism for Elevators and other Machinery.

No. 237,762. Patented Feb. 15, 1881.

WITNESSES:
C. Neveux
C. Sedgwick

INVENTOR:
V. W. Mason
BY Munn & Co
ATTORNEYS.

UNITED STATES PATENT OFFICE.

VOLNEY W. MASON, OF PROVIDENCE, RHODE ISLAND.

REVERSING MECHANISM FOR ELEVATORS AND OTHER MACHINERY.

SPECIFICATION forming part of Letters Patent No. 237,762, dated February 15, 1881.

Application filed July 19, 1880. (No model.)

*To all whom it may concern:*

Be it known that I, VOLNEY W. MASON, of Providence, in the county of Providence and State of Rhode Island, have invented a new and Improved Reversing Mechanism for Elevators and other Machinery, of which the following is a specification.

Figure 1:
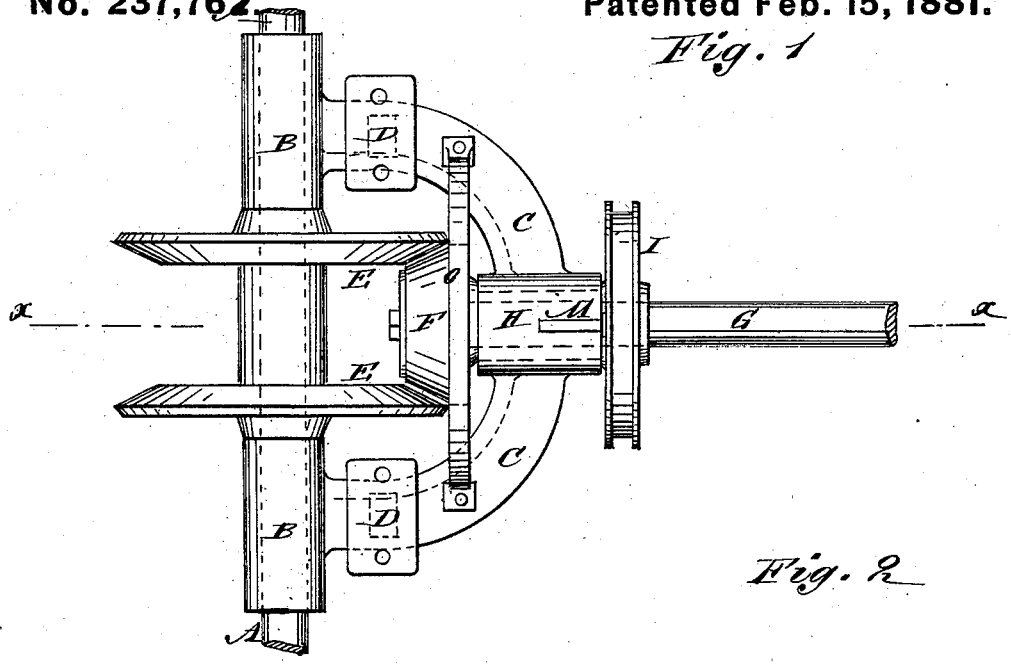
Figure 2:
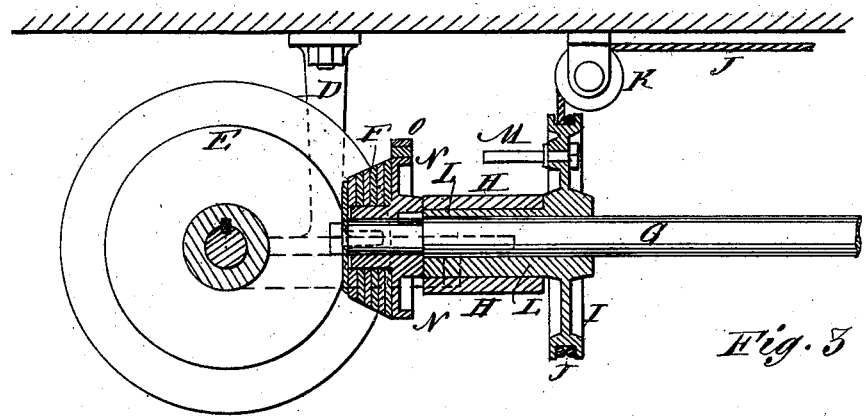
Figure 3:
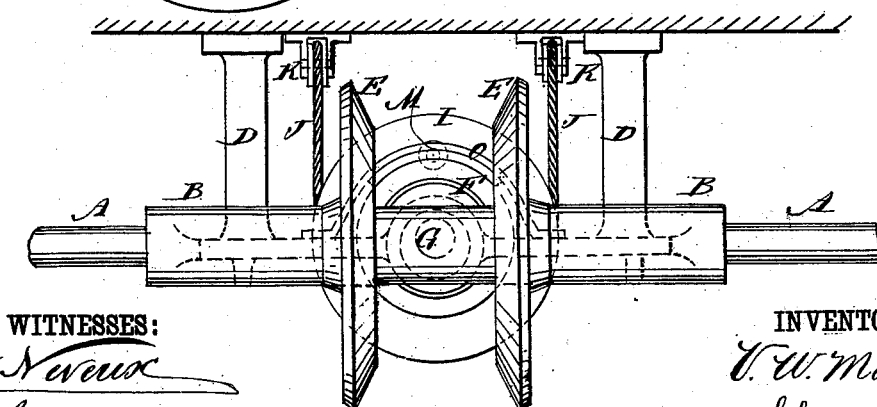

Figure 1 is a plan view of the improvement. Fig. 2 is a sectional side elevation taken through the line $x\,x$, Fig. 1. Fig. 3 is an end elevation.

Similar letters of reference indicate corresponding parts.

The object of this invention is to furnish a mechanism for reversing the movement of elevators and other machines where the direction of the motion is required to be changed in the machine while the driving mechanism continues to move in the same direction, and which shall be simple in construction and reliable in operation.

The invention consists in constructing a reversing mechanism of a pair of beveled friction-wheels attached to the driving-shaft, the beveled friction-wheel having a rim, and attached to the shaft with which is connected the machinery to be reversed, the pulleys carrying the reversing-cord, the eccentric-sleeve for shifting the movable friction-wheel, the stationary brake, and the stop-pin, as will be hereinafter fully described.

A represents the driving-shaft, to which motion is given from a steam-engine or other convenient power, and which revolves in bearings B in the ends of a semicircular bar or plate, C, attached to hangers D, secured to the beams of the room or other suitable supports.

To the shaft A are attached two beveled friction-wheels, E, between which is placed a beveled friction-wheel, F, attached to the end of a shaft, G. The shaft G revolves in bearings H, attached to the bend of the bar C, and to other suitable supports. The beveled friction-wheels E F may be made of leather or other suitable material.

With the shaft G is connected the elevator or other machinery to be driven, and upon the said shaft is placed a grooved pulley, I, around which passes a cord, J. The cord J makes one or more turns around the pulley I, passes over guide-pulleys K, and is led down the elevator-well, or into such a position that it can be conveniently reached and operated to reverse the motion, when desired. In the case of an elevator, the cord J is provided with stops to reverse the motion automatically when the cage reaches the upper and lower limits of its movement.

To the hub of the pulley I is attached, or upon it is formed, an eccentric-sleeve, L, which passes through and works in the bearing H, and serves as a bearing for the shaft G, so that by turning the eccentric-sleeve L to bring its longest radius toward one or the other of the wheels E, the end of the shaft G will be moved enough to bring the friction-wheel F into contact with the other wheel E. The eccentricity of the sleeve L should be such that the wheel F will come in contact with the wheel E before the longest radius of the said sleeve L quite reaches a position parallel with the axis of the wheels E, so that the tendency will be to make the contact between the wheels F E closer. The movement of the sleeve L is limited by a pin, M, attached to the pulley I, and which comes in contact with the bar C, that carries the bearings B H.

Upon the beveled friction-wheel F is formed, or to it is attached, a rim, N, which, when the longest radius of the eccentric-sleeve L moves upward in shifting the said sleeve L, comes in contact with a stationary brake, O, to check the motion of the shaft G and prevent the elevator-cage or the machine from being carried forward by its own momentum after the wheel F moves out of contact with one of the wheels E, and before it comes in contact with the other wheel E.

The driving-power may be applied to either of the shafts A G, and the machinery to be driven connected with the other shaft.

Having thus described my invention, what I claim as new, and desire to secure by Letters Patent, is—

1. A reversing mechanism constructed substantially as herein shown and described, consisting of the beveled friction-wheels E, attached to the shaft A, the beveled friction-wheel F, attached to the shaft G, the pulleys I K, carrying cord J, the eccentric-sleeve L, the rim N, the stationary brake O, and the stop-pin M, as set forth.

2. In a reversing mechanism, the combination, with the beveled friction-wheels E F and the shafts A G, of the pulleys and cord I K J and the eccentric-sleeve L, substantially as herein shown and described, whereby the wheel F is shifted from one to the other of the wheels E, as set forth.

3. In a reversing mechanism, the combination, with the pulley I, the eccentric-sleeve L, and the bearings supporting bar C, of the stop-pin M, substantially as herein shown and described, whereby the movement of the pulley and eccentric-sleeve is limited, as set forth.

4. In a reversing mechanism, the combination, with the shifting friction-wheel F, having rim N, the shaft G, the pulley I, and the eccentric-sleeve L, of the stationary brake O, substantially as herein shown and described, whereby the elevator or machine is held from being carried forward by its own weight while the motion is being reversed, as set forth.

VOLNEY W. MASON.

Witnesses:
 EBENEZER RICHMOND,
 EDGAR H. BOSS.